United States Patent
Stretch et al.

(10) Patent No.: US 11,680,535 B2
(45) Date of Patent: Jun. 20, 2023

(54) ON BOARD DIAGNOSTIC METHOD FOR ELECTROMAGNETIC LATCH ASSEMBLY

(71) Applicant: Eaton Intelligent Power Limited, Dublin (IE)

(72) Inventors: Dale Arden Stretch, Novi, MI (US); Arjun T. R., Kerala (IN); Amogh Vilas Kank, Maharashtra (IN)

(73) Assignee: Eaton Intelligent Power Limited, Dublin (IE)

( * ) Notice: Subject to any disclaimer, the term of this patent is extended or adjusted under 35 U.S.C. 154(b) by 146 days.

(21) Appl. No.: 17/287,436

(22) PCT Filed: Oct. 30, 2019

(86) PCT No.: PCT/EP2019/025371
§ 371 (c)(1),
(2) Date: Apr. 21, 2021

(87) PCT Pub. No.: WO2020/088799
PCT Pub. Date: May 7, 2020

(65) Prior Publication Data
US 2021/0388792 A1 Dec. 16, 2021

Related U.S. Application Data

(60) Provisional application No. 62/876,001, filed on Jul. 19, 2019, provisional application No. 62/753,870, filed on Oct. 31, 2018.

(51) Int. Cl.
*F02D 41/22* (2006.01)
*F01L 9/20* (2021.01)
(Continued)

(52) U.S. Cl.
CPC ............ *F02D 41/221* (2013.01); *F01L 1/047* (2013.01); *F01L 1/18* (2013.01); *F01L 1/46* (2013.01);
(Continued)

(58) Field of Classification Search
CPC ..... F01L 1/185; F01L 1/18; F01L 1/46; F01L 13/0005; F01L 2001/186; F01L 2013/001;
(Continued)

(56) References Cited

U.S. PATENT DOCUMENTS

| 10,371,016 B2 | 8/2019 | McCarthy, Jr. | |
| 10,781,726 B2 | 9/2020 | McCarthy, Jr. | |
| 2018/0163577 A1* | 6/2018 | McCarthy, Jr. | ....... F02D 41/221 |

FOREIGN PATENT DOCUMENTS

WO    WO-2016197088 A1 * 12/2016 ................ F01L 1/18

* cited by examiner

*Primary Examiner* — Gonzalo Laguarda
(74) *Attorney, Agent, or Firm* — Baker Botts L.L.P.

(57) ABSTRACT

A method of providing diagnostic information for an electromagnetic latch assembly (122) includes providing a pulse to a circuit (200) that include one or more electromagnetic latch assemblies. The circuit (200) includes coils (199) of the electromagnetic latch assemblies. Each coil is inductively coupled with an armature (131) that is mechanically coupled to a latch pin (118). The circuit (200) is pulsed and a DC current in the circuit (200) that results from the pulse is measured over a first interval to determine a primary response. The current in the circuit (200) over a second interval is measured to determine a reference response. A second pulse may be used to generate the current for the reference response. The primary response and the reference response are compared to provide diagnostic information relating to position or movement of one or more of the latch pins (118).

16 Claims, 12 Drawing Sheets

(51) Int. Cl.
*F01L 1/047* (2006.01)
*F01L 1/18* (2006.01)
*F01L 1/46* (2006.01)
*F01L 13/00* (2006.01)
*F02D 13/06* (2006.01)
*H01F 7/18* (2006.01)

(52) U.S. Cl.
CPC .............. *F01L 9/20* (2021.01); *F01L 13/0005* (2013.01); *F02D 13/06* (2013.01); *H01F 7/1844* (2013.01)

(58) Field of Classification Search
CPC ............... F01L 2305/00; F01L 2800/11; F01L 2810/03; F01L 2820/02; F01L 9/20; F02D 2041/2058; F02D 2041/221; F02D 41/221; F02D 13/06; H01F 7/1844
See application file for complete search history.

ON BOARD DIAGNOSTIC METHOD FOR ELECTROMAGNETIC LATCH ASSEMBLY

FIELD

The present teachings relate to electromagnetic latch assemblies, particularly electromagnetic latch assemblies used in valvetrains to provide variable valve lift (VVL) or cylinder deactivation (CDA).

BACKGROUND

Some rocker arm assemblies such as switching roller finger followers (SRFFs) use latches to implement variable valve lift (VVL) or cylinder deactivation (CDA). There has been a long felt need to provide diagnostic systems that report whether these latches are operating as intended. But a practical system for providing that information has proven elusive.

SUMMARY

The present teachings relate to a method of providing diagnostic information for an electromagnetic latch system. The method includes providing a pulse to a circuit that include the coils of one or more electromagnetic latch assemblies in the electromagnetic latch system. Each coil is inductively coupled with an armature that is mechanically coupled to at least one latch pin among one or more latch pins in the electromagnetic latch system. A current in the circuit that results from the pulse is measured over a first interval to determine a first response. The current in the circuit is measured over a second interval to determine a second response. The first and second responses are compared to provide diagnostic information relating to position or movement of the one or more latch pins.

In some of these teachings, the first pulse is predetermined to be capable of actuating the one or more latch pins while the second pulse is predetermined to be insufficient in duration to actuate any of the latch pins. In some of these teachings, the first pulse and the second pulse have opposite polarities.

The second interval may be contemporaneous with the first interval, whereby conditions such as temperature and voltage that may vary over time and affect the current in the circuit do not vary significantly between the first interval and the second interval. The second interval may come shortly before or shortly after the first interval. In some of these teaching, the second interval is within 60 seconds of the first interval. In some of these teaching, the second interval is within 1 second of the first interval. In some of these teachings the electromagnetic latch assemblies switch rocker arm assemblies in a valvetrain and the first and second intervals are both within an interval between two consecutive lift periods of a cam. The current may be allowed to decay between pulses. It may take between 0.5 msec and 5 msec for the current to decay.

Each of the latch pins is translatable between a first position and a second position under the influence of its respective coil. In some aspects of the present teachings, the first latch pin position provides a configuration in which a rocker arm assembly is operative to actuate a moveable valve in response to actuation by a cam to produce a first valve lift profile. The second latch pin positions provides a configuration in which the rocker arm assembly is operative to actuate the moveable valve in response to actuation by another cam to produce a second valve lift profile, which is distinct from the first valve lift profile, or the moveable valve is deactivated. This structure may provide cylinder deactivation (CDA) or variable valve lift (VVL).

The electromagnetic latch assemblies may be of a type in which the latch pins are stable independently from the coils in both the first and the second positions. The latch pins are actuated from the first position to the second position by providing the corresponding coils with a DC current in a first direction. The latch pins are actuated from the second position to the first position by providing the corresponding coils with a DC current in a second direction, which is opposite the first. Each latch pin may be stabilized in both the first and second positions by one or more permanent magnets.

In some of these teachings, the first pulse is an actuating pulse: one that is predetermined to be sufficient to actuate the latch pins associated with the circuit provided that the mechanisms are operating correctly and the pulse has the correct polarity in relation to the current latch pin positions. In some of these teachings, the second pulse is a non-actuating pulse: one that is predetermined to be too short to actuate any of the latch pins. Accordingly, the second pulse may be shorter than the first. The current response to the second pulse may be compared to the current response to the first pulse to determine whether latch actuation was successful. In some of these teachings, the second pulse occurs after the first pulse.

In some of these teachings, a third pulse is provided and a current produced by the third pulse measured to determine a third response. In these teachings, the first pulse is an actuating pulse, the second pulse is a non-actuating pulse, and third pulse is a non-actuating pulse having an opposite polarity from the second pulse. The first response may be compared to each of the second response and the third response to provide a robust determination of whether one or more latch pins moved in response to the first pulse.

If the polarity of a pulse is the correct polarity for urging the latch pin out of its present position, the current rise will be substantially slower than if the pulse is of the wrong polarity. If an attempt to actuate the latch pin was successful, the current rise during a second pulse of the same polarity as the first pulse will be much more rapid than the current rise over an equivalent period at the beginning of the first pulse. If the attempt was not successful, the current rise during the second pulse will be essentially the same as the current rise during the first pulse.

In some of these teachings, each electromagnetic latch assembly is symmetrical in that the magnetic field that holds the latch pin in the first position is approximately a mirror image of the magnetic field that holds the latch pin in the second position. In some of these teachings, each electromagnetic latch assembly is symmetrical in that the energy required to move the latch pin from the first position to the second position is approximately equal to the energy required to move the latch pin from the second position to the first position.

If each electromagnetic latch assembly is symmetrical, the absolute value of the current rise in the third response can be compared to the absolute value of the current rise in the first response. If an attempt to actuate the latch pin was successful, the absolute value of the current rise in the third response will be the same as the absolute value of the current rise in the first response. Similarity between the first and third responses combined with dissimilarity between the first and second responses provides a strong indication of a successful latch actuation. Likewise, dissimilarity between the first and third responses combined with similarity between the first and second responses provides a strong indication of an un-successful latch actuation.

In accordance with some of the present teachings, the current responses to two non-actuating pulses having opposite polarity are used to evaluate the current position of the latch pin. Both the current rise and the current decay will be attenuated for the case in which the pulse is of correct polarity for actuating a latch pin from its present position as compared to the case where the pulse polarity is incorrect for actuating latch pin from its present position In some of the present teachings, each coil is mounted to a rocker arm of its respective rocker arm assembly. In some aspects of the present teachings, the circuit includes two coils associated with two latch pins and the comparison between the first response and the second and/or third response is able to distinguish among the three cases consisting of neither latch pin moved in response to the pulse, only one of the latch pins moved in response to the pulse, and both latch pins moved in response to the pulse. In applications like the valvetrain it may be desirable to place two coils in one circuit and many of the methods of the present disclosure are able to distinguish among the three cases.

In some of these teachings, the first pulse is predetermined to be capable of actuating the latch pins corresponding to the coils, whereby the latch pins corresponding to the coils in the circuit are intended to actuate in response to the first pulse. The second pulse, however, is not intended to actuate any latch pins. In some of these teachings, the second pulse takes place while a cam is on lift and prevents movement of one of the latch pins associated with the cam.

According to some aspects of the present teachings, a pulse is provided to actuate one or more latches. Measurements of the current that results from the pulse are taken over a first interval to provide a primary response. Measurements of the current that results from the pulse are taken over a second interval, which follows the first interval, to determine a reference response. The pulse may be sufficiently long that the current in the circuit approaches a steady state. In some of these teachings, the reference response is representative of that near steady state response regardless of whether latch pins in the circuit are actuated by the pulse. The primary response may be for a period in which the current will be near the steady state for cases in which no latches actuate, but readily distinguishable from steady state for cases in which one or more latch pins are actuated by the pulse.

In some of the present teachings, the first interval is less than the duration of the pulse. In some of the present teachings, the first interval is two thirds or less the duration of the pulse. In some of the present teachings, the first interval is shortened by eliminating measurements corresponding to a tail end of the pulse. Differences in current response relating to latch pin movement are more pronounced during the earlier portion of the pulse period. Also, when the first interval is shortened by eliminating measurements corresponding to the tail end of the pulse, a second pulse used to provide a reference response can be made shorter, which facilitates completing the diagnostic within a short time frame such as the period between two consecutive cam lifts.

In some of these teachings, the first interval is shortened by eliminating measurements corresponding to period at the beginning of the pulse. Data during the beginning period may include a disproportionate amount of noise, particularly if the data is used to estimate time derivatives of the current.

In some of these teachings, the power used to provide the pulses is provided by a vehicle electrical system having a variable voltage. A vehicle electrical system voltage may vary between 9V and 16V. In some of these teachings, a voltage provided by a vehicle electrical system is increased prior to supply to the coil circuit. If the voltage is much higher than required for latch pin actuation, the differences in current response between cases in which one or more latch pins actuate and cases in which no latch pins actuate may become hard to detect. In some of the present teachings, the voltage of the coil circuit is limited to facilitate providing diagnostic information. Coil temperature also affects the magnitude of the current and the magnitude of the differences. In some of the present teachings, the voltage limit is adjusted based on temperature. A control may be used to set the voltage limit.

The steady state current in the circuit is affected by both voltage and temperature. In some of the present teachings, a voltage used to provide a pulse is adjusted based on a measurement of current. Adjustments to the voltage may be used to control the current. The current determines the forces applied to the latch pins by the coils.

The steady state current level may vary due to uncontrolled voltage variations, temperature variations, or the like. If the current varies, the time required for the latch pins to actuate also varies. In some of these teachings, an interval over which a response is determined is selected based on one or more current measurements. Selecting the interval in relation to the current allows the interval to focus on a period over which the current response is most sensitive to latch pin position or movement.

The primary purpose of this summary has been to present certain of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will be conveyed to one of ordinary skill in the art by the following detailed description together with the drawings. The specifics disclosed herein may be generalized, narrowed, and combined in various ways with the ultimate statement of what the inventors claim as their invention being reserved for the claims that follow.

DETAILED DESCRIPTION

Figure 1:
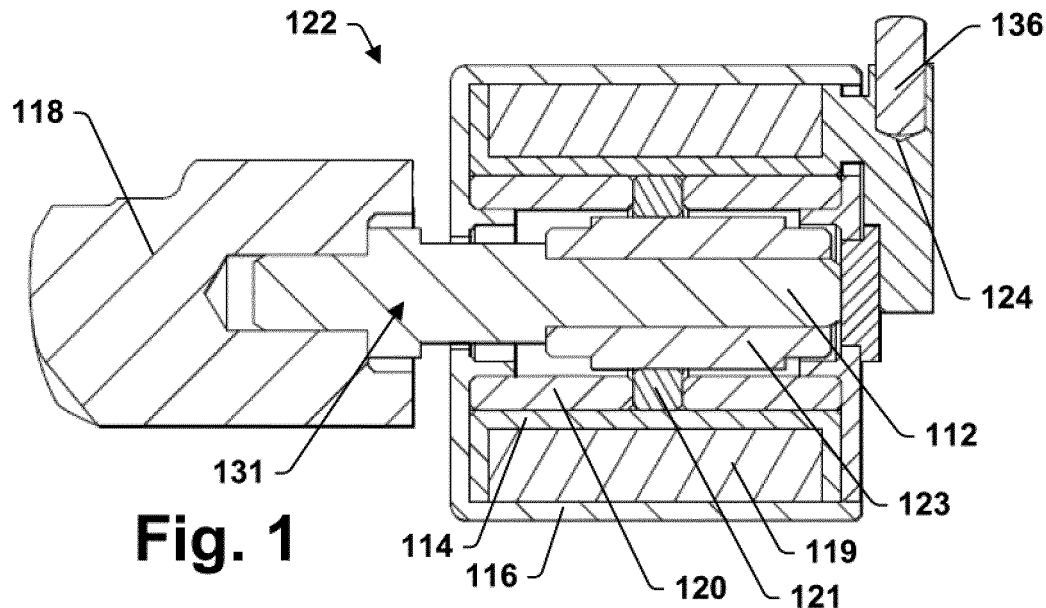
FIG. 1 is a cross-sectional view of an electromagnetic latch assembly according to the present teachings with a latch pin in a non-engaging position.
Figure 2:
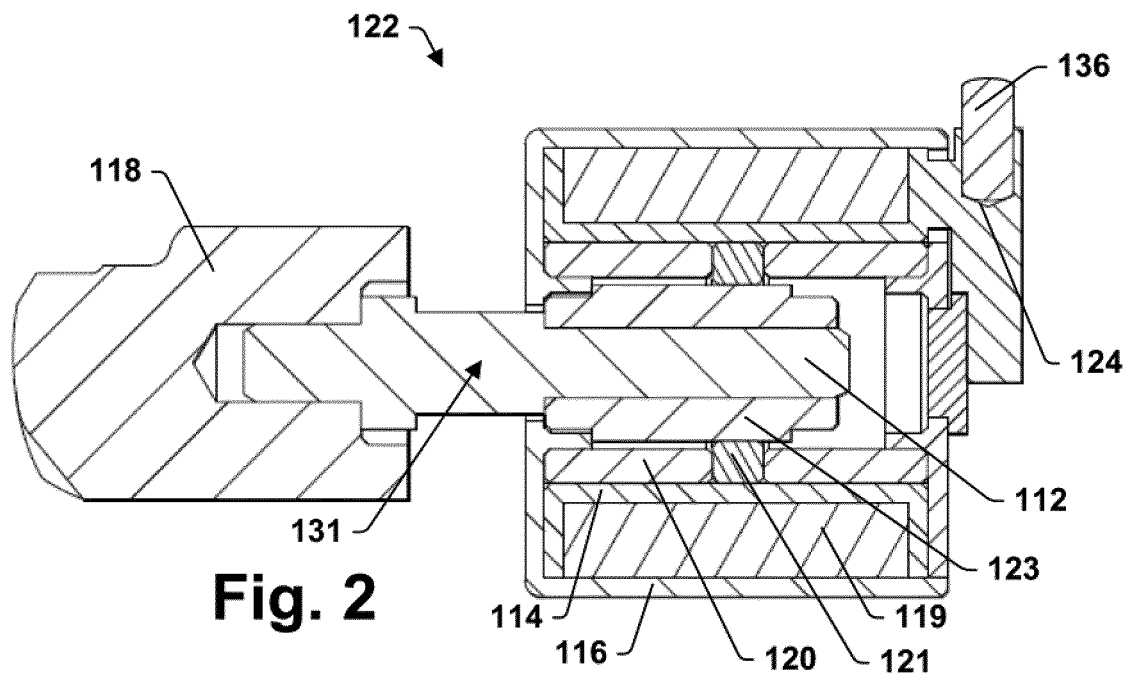
FIG. 2 is the view of FIG. 1 but with the latch pin in an engaging position.

FIGS. 1-2 illustrate an electromagnetic latch assembly 122 to which diagnostic methods according to the present teachings may be applied. Electromagnetic latch assembly 122 includes an armature 131, a coil 119, and two permanent magnets 120. Armature 131 has a paramagnetic core 112 and a ferromagnetic ferule 123. Latch pin 118 is attached to armature 131. Coil 119 is a coil of wire that may be wound about a bobbin 114 and contained within a low coercivity ferromagnetic shell 116. Bobbin 114 has coil tie-offs 124. Coil tie-off pins 136 are installed in coil tie-offs 124 and provide terminals for powering coil 119. Permanent magnets 120 are arranged with confronting polarities and are separated by a ring 121, which may be made of ferromagnetic material.

FIG. 1 shows electromagnetic latch assembly 122 with armature 131 retracted and latch pin 118 in a first position, which may be non-latching position. FIG. 2 shows electromagnetic latch assembly 122 with armature 131 extended and latch pin 118 in a second position, which may be described as a latching position. Permanent magnets 120 operate on armature 131 through ferule 123 and magnetic circuits that may be completed by ring 121 and shell 116. The magnetic circuits taken by flux from permanent magnets 120 shift as armature 131 moves latch pin 118 between the first and second positions. The shift in magnetic circuits allows the same two permanents magnets 120 to stably maintain the position of latch pin 118 in both the first position and the second position.

Coil 119 is operable to alter magnetic polarizations in the magnetic circuits taken by flux from permanent magnets 120. Energized with current in a first direction, coil 119 is operable to cause armature 131 to translate from the first position to the second position. Once armature 131 is in the second position, permanent magnets 120 will stably maintain armature 131 in the second position after power to coil 119 is cut off. Energized with current in a second direction, which is opposite the first, coil 119 is operable to cause armature 131 to translate from the second position back to the first position. Once armature 131 is in the first position, permanent magnets 120 will stably maintain armature 131 in the first position after power to coil 119 is again cut off.

Figure 3:
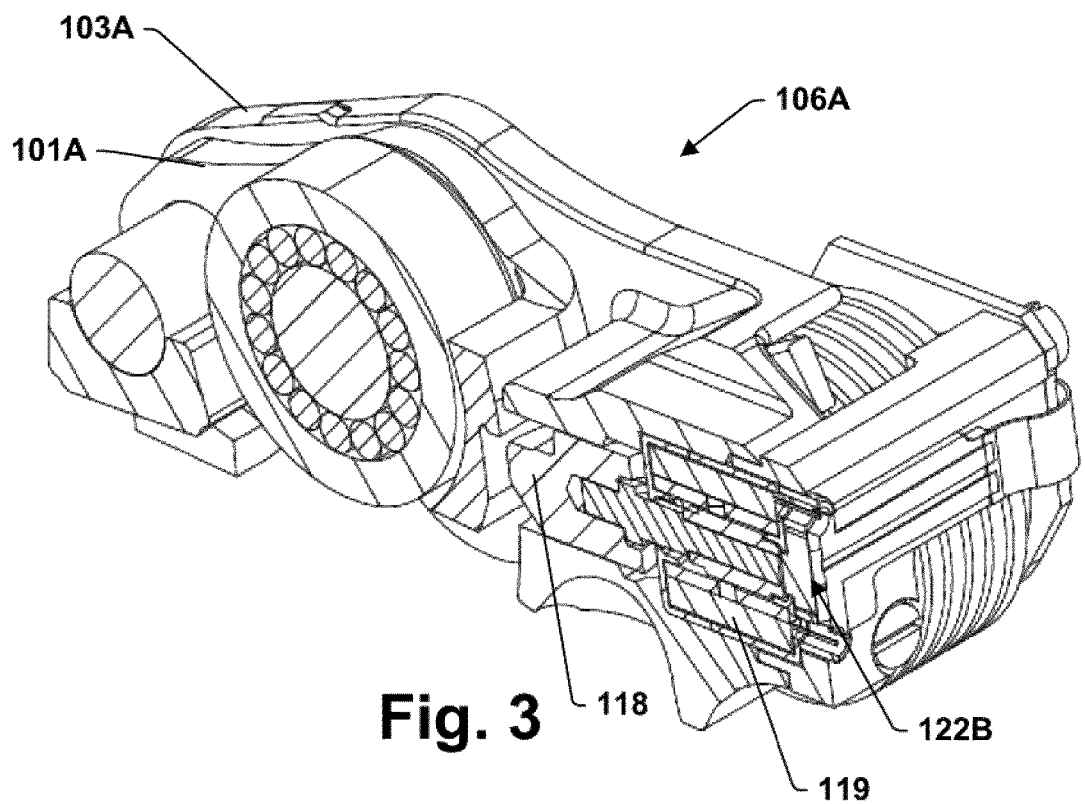
FIG. 3 is a cut-away view of a rocker arm assembly that can be fit with an electromagnetic latch assembly according to the present teachings.
Figure 4:
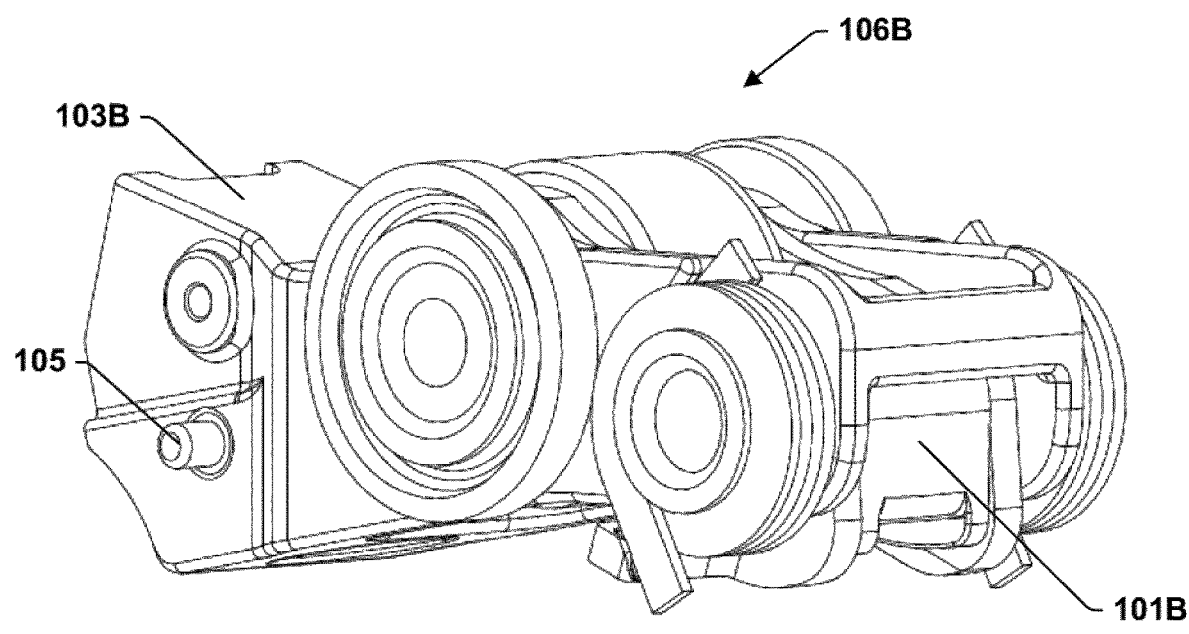
FIG. 4 is a perspective view of another rocker arm assembly that can be fit with an electromagnetic latch assembly according to the present teachings.

FIGS. 3 and 4 illustrate rocker arm assemblies 106A and 106B that include inner arms 101 and outer arms 103. Electromagnetic latch assembly 122 may be installed in the outer arm 103 of either of these rocker arm assemblies 106. Rocker arm assembly 106A is illustrated with an electromagnetic latch assembly 122B which, like electromagnetic latch assembly 122, includes a coil 119 and a latch pin 118. Mounting electromagnetic latch assembly 122B to outer arm 103A mounts coil 119 to outer arm 103A.

Figure 5:
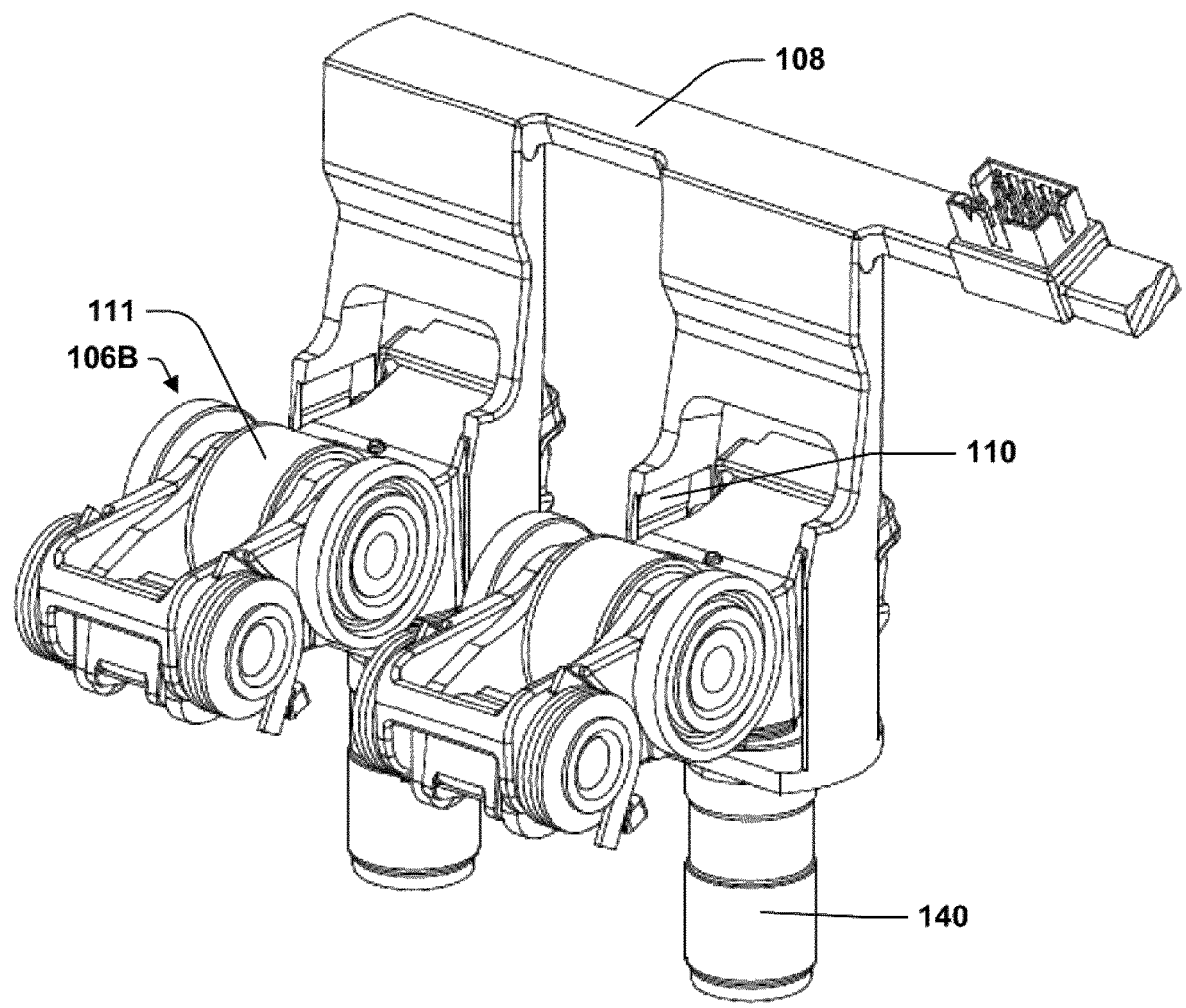
FIG. 5 illustrates a portion of a valvetrain including a structure for providing power to the rocker arm assemblies of FIG. 4.

Operating electromagnetic latch assemblies 122 on rocker arm assemblies 106 requires power transfer to rocker assemblies 106. A sliding contact pin 105 may be mounted to one side of rocker arm assembly 106B for receiving this power. There may be one contact pin 105 on each side of rocker arm assembly 106B to provide two poles. Alternatively, the electromagnetic latch assembly 122 may be grounded through the structure of rocker arm assembly 106B. As shown in FIG. 5, a framework 108 may locate against pivots 140 and hold contact pads 110 in abutment with contact pins 105. Contact pins 105 slide across the surfaces of contact pads 110. Contact may be maintained even as rocker arm assembly 106B is actuated and as rocker arm assembly 106B is raised and lowered by pivot 140 to adjust lash.

Figure 6:
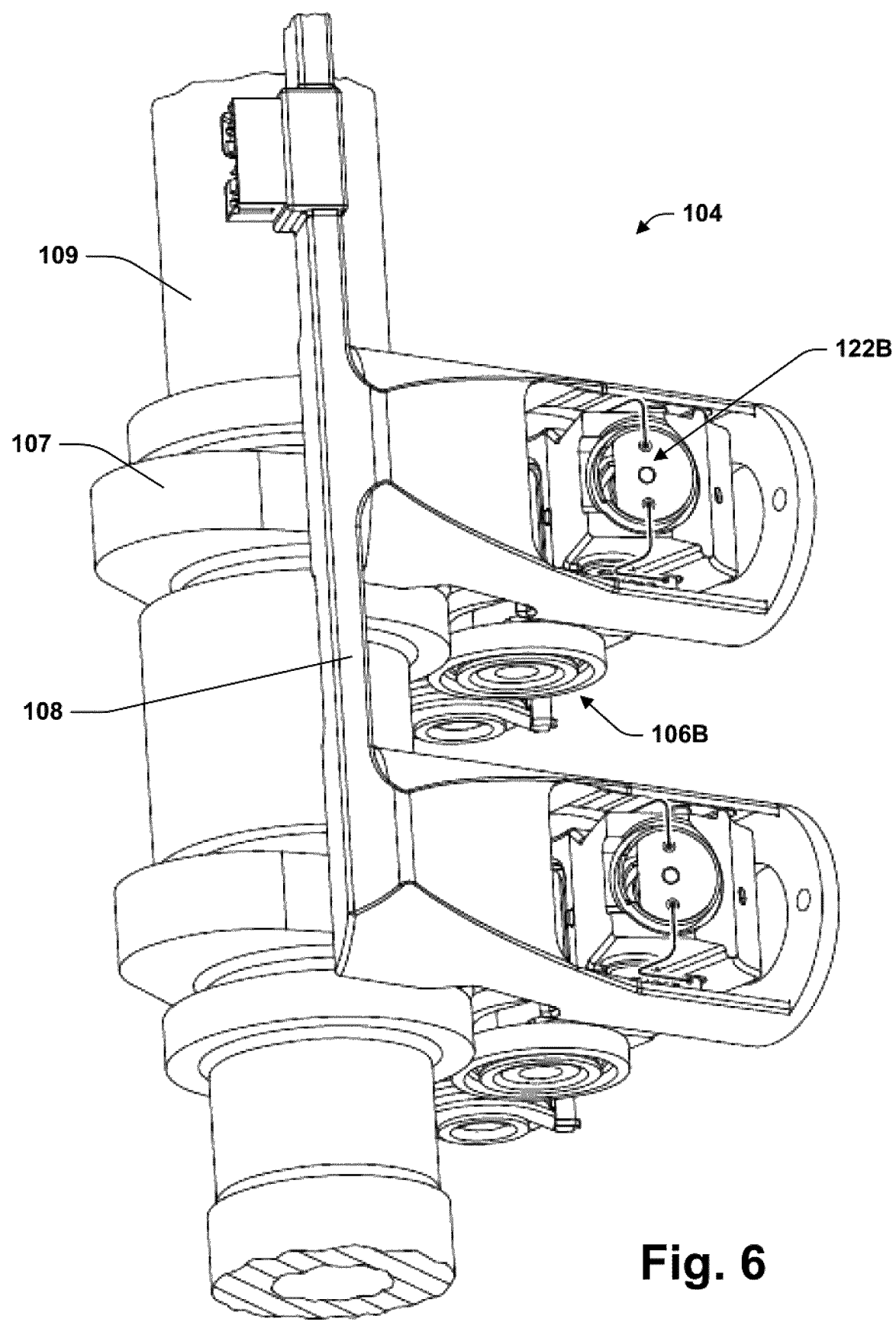
FIG. 6 illustrates a portion of a valvetrain that includes the rocker arm assemblies of FIG. 4.
Figure 7:
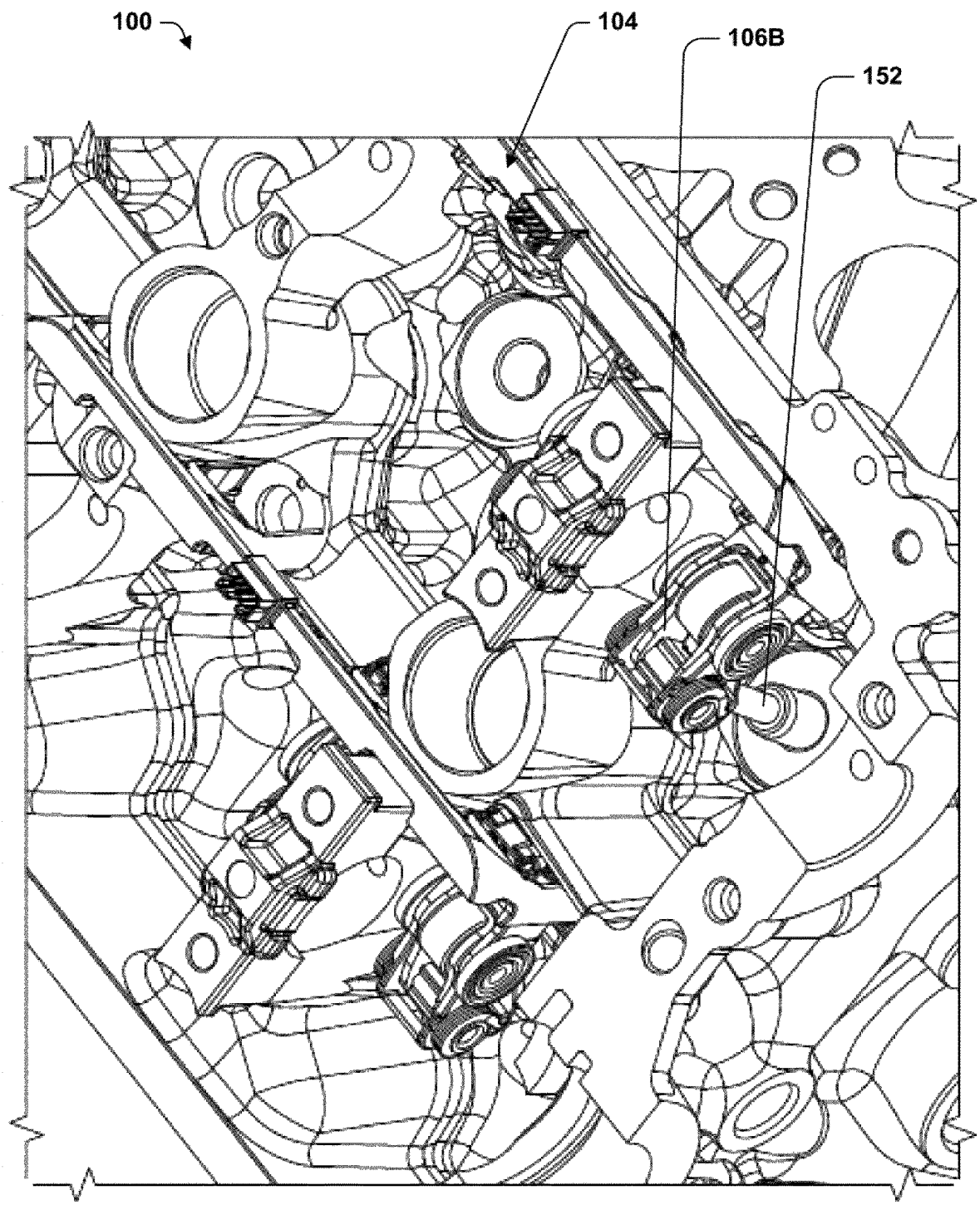
FIG. 7 illustrates a portion of an internal combustion engine that includes the valvetrain of FIG. 6.

Rocker arm assemblies 106 include cam followers 111 on inner arms 103, which are pivotally connected to outer arms 103. As shown in FIG. 6, a valvetrain 104 includes a camshaft 109 with cams 107 configured to engage and actuate rocker arm assemblies 106 through cam followers 111 as camshaft 109 rotate. If latch pin 118 is in the latching position, this actuation will cause inner arms 101 and outer arms 103 to pivot together on pivots 140. As can be seen from FIG. 7, when valvetrain 104 is installed in an internal combustion engine 100, this motion will cause valve 152 to open and close in relation to the cam cycle. On the other hand, if latch pin 118 is in the non-latching position, this motion will cause inner arm 101B to pivot while outer arm 103B remains stationary and valve 152 remains closed.

Two or more electromagnetic latch assemblies 122B may constitute an electromagnetic latch system. Two or more coils 119, each operating distinct latch pins 118, may be arranged in a single circuit. For example, two latch pins 118 may be associated with two rocker arm assemblies 106 that actuate either two intake valves or two exhaust valves associated with a single engine cylinder.

Figure 8:
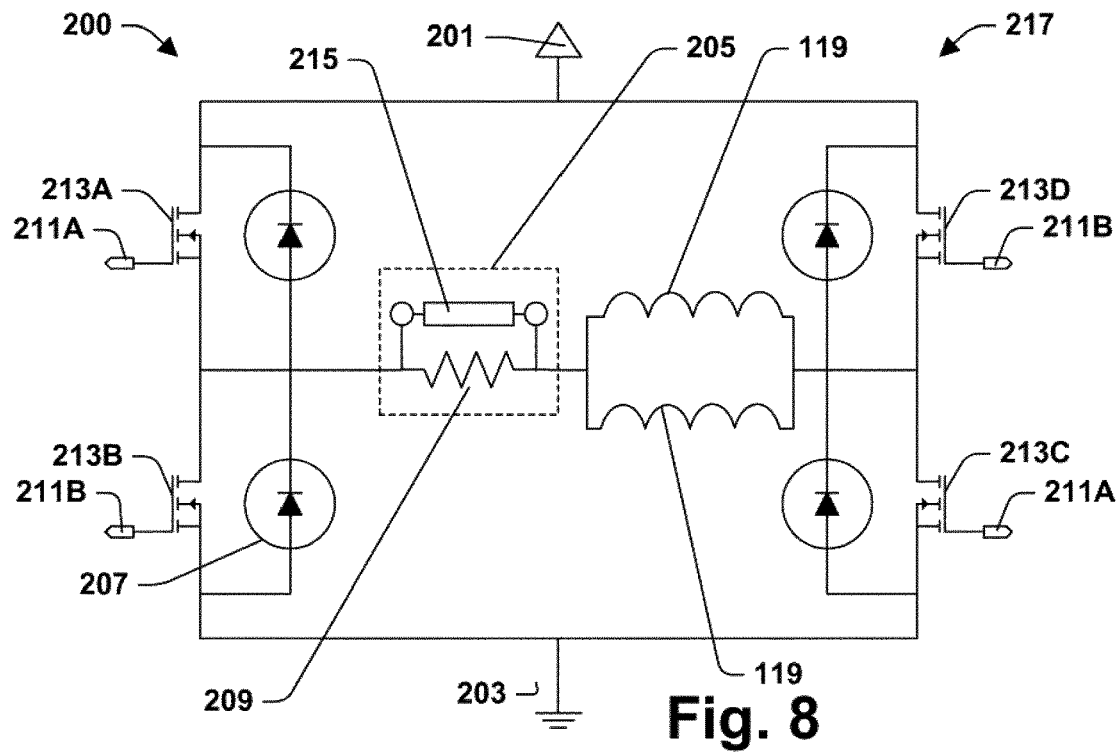
FIG. 8 is a circuit diagram for the valvetrain of FIG. 6.

FIG. 8 provides a diagram of a circuit 200 that may be used to drive two coils 119 with a DC current in either direction depending on the desired polarity of the magnetic field and to provide diagnostic information using methods according to the present teachings. While in circuit 200 coils 119 are connected in parallel, they may alternatively be connected in series. Circuit 200 is shown having two coils 119 but could have only a single coil 119 or more than two coils 119. Circuit 200 may include current sensor 205 and an H-bridge 217. H-bridge 217 may include switches 213A-D that are controlled through signal 211A and 211B. Flash back diodes 207 prevent damage to switches 213A-D.

Signal 211A closes switches 213A and 213C allowing current from voltage source 201 to flow to ground 203 through coils 119 in a first direction. Signal 211B closes switches 213B and 213D allowing current from voltage source 203 to flow to ground 201 through coils 119 in a second direction, which is opposite the first direction. Signals 211A and 211B may be provided by a controller (not shown). Sensor 205 may communicate with the controller. Sensor 205 may be any suitable type of current sensor. Sensor 205 may include a shunt resistor 209 and a voltage measuring device 215 connected across shunt resistor 209. Sensor 205 could also be a Hall effect sensor or the like.

The voltage of power source 201 may vary as does the voltage in many vehicle electrical systems. In some of these teachings, power source 201 is connected to a vehicle electrical system through a transformer that provides a higher voltage than the operating voltage of the vehicle's electrical system. In some of these teaching, the voltage of power source 201 is regulated by a controller.

Figure 9:
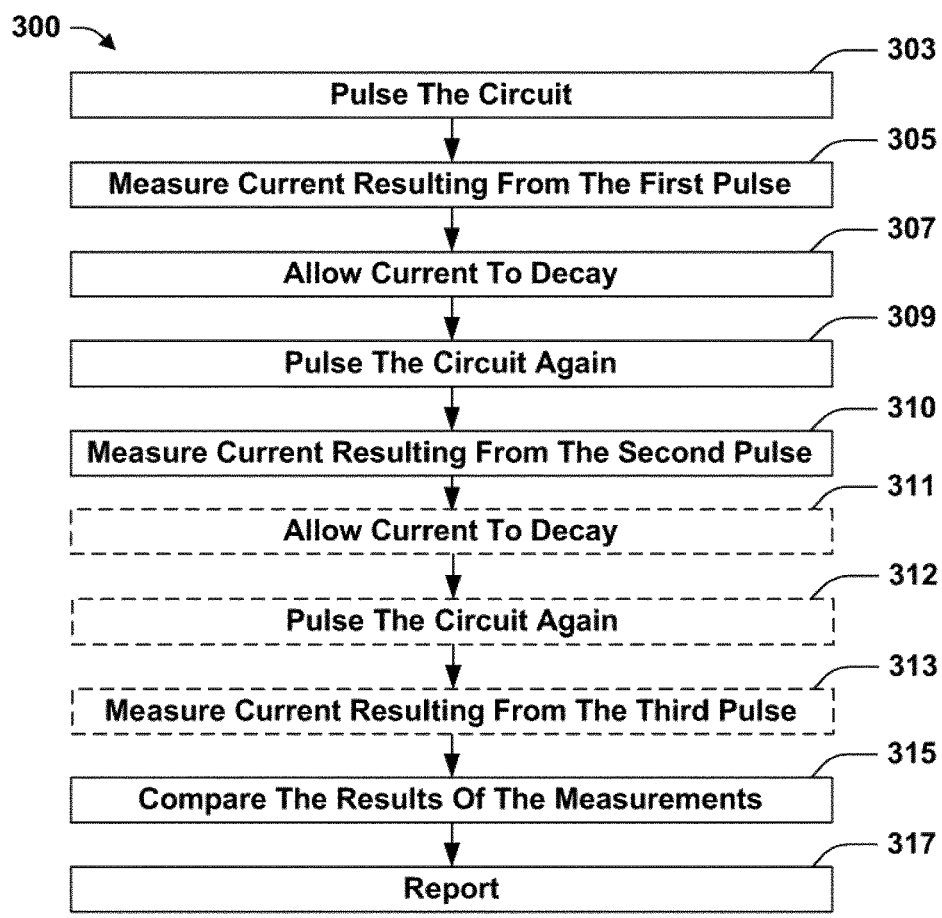
FIG. 9 is a flow chart of a method according to some aspects of the present teachings.

FIG. 9 provides a flow chart of a method 300 in accordance with some aspects of the present teachings. Method 300 applies two pulses to a circuit, such as circuit 200, although some methods according to the present teaching require only one pulse. Method 300 begins with act 303, pulsing the circuit. The pulse may be initiated by a controller. In some of these teachings, the pulse is initiated in response to a command to switch a latch pin 118. In some of these teachings, the pulse is initiated in response to a command to query the position of a latch pin 118. In some of these teachings, the command to query latch pin position immediately follows an attempt to actuate a lath pin 118.

In a system that has a cam 107 and in which the pulse is intended to switch a latch pin 118, a pulse to actuate the latch pin 118 may be initiated as the cam 107 comes off lift or slightly earlier. A period may elapse between the beginning of a pulse that actuates a latch pin 118 and the beginning of movement of the latch pin 118. In some of these teachings, the pulse is initiated before cam 107 comes off lift to ensure that latch pin 118 completes actuation before the next lift of cam 107. On the other hand, in some of these teachings, the pulse has insufficient duration to actuate any latch pins 118. A sufficient duration depends on many factors. In some examples, a sufficient duration is in the range from 2 msec to 10 msec, for example 8 msec. In some of these teachings, latch pin position is queried within one cam cycle of an attempt to actuate a latch pin 118.

Act 305 is measuring a current in the circuit that results from the pulse. The measurements may determine a primary response and may be taken over the entire pulse period, or some fraction of the pulse period. Measurements may be taken at intervals. In some of these teachings, the intervals are between 0.01 msec and 1 msec. In some of these teachings, the intervals are between 0.2 msec and 0.4 msec. In some of these teachings, multiple measurements are taken over each interval to produce for example 3 or more data points. In some of these teachings, the current data is a single measurement taken a fixed interval after the start of the pulse, for example, 0.3 msec after the start of the pulse. In some of these teachings, the interval is timed such that one or more latch pins 118 will be in motion provided that the pulse is effective for actuating one or more of the latch pins 118. The difference between a current response that moves one or more latch pins 118 and one that does not may be most apparent at such a sampling time.

Act 307 is allowing the current in the circuit produced by the pulse of act 303 to decay. As the period of the pulse increases, the current in the circuit may approach a steady state. After the end of the pulse, the current in the circuit decays over a period. In some of these teachings, the current in the circuit is allowed to decay to 5% or less its steady state value. In some of these teachings, the current in the circuit is allowed to decay to 1% or less its steady state value. In some of these teachings, the current in the circuit is allowed to decay until it can no longer be measured. In some of these teachings, the time allowed for decay is between 5% and 50% of the pulse period required to actuate a latch pin 118. In some of these teachings, the time allowed for decay is between 0.1 msec and 10 msec, for example 3 msec.

Act 309 is pulsing the circuit again. The second pulse may be as long as the first. In some of these teachings, however, the second pulse is shorter than the first. In some of these teachings, the second pulse is two thirds or less the duration of the first pulse. In some of these teachings, the second pulse is half or less the duration of the first pulse. In some of these teachings, the first pulse has a length sufficient to move a latch pin 118 provided the pulse has the correct polarity, while the second pulse has an insufficient length. In some of these teachings, the second pulse has the length of an interval between the beginning of the first pulse and a first measurement of the current in the circuit. In some of these teachings, the second pulse has the same polarity as the first.

In some alternative embodiments, both the first pulse and the second pulse are non-actuating pulses. In these alternative teachings, the second pulse has a polarity opposite the first pulse. In some of these teachings, the first pulse is predetermined to have the wrong polarity to actuate any latch pin 118. In those examples, the second pulse may be an actuating pulse.

Act 310 is measuring a current in the circuit that results from the second pulse. The measurements may determine a reference response. The measurement may be taken over the entire pulse period, or over only a portion of the period of the second pulse. The measurements may be taken at intervals that correspond to the intervals used for the one or more measurements of Act 305.

In some of these teachings, the second pulse is completed before cam 107 goes on lift. In some embodiments, it is conceivable that the second pulse would inadvertently cause one or more of the latch pins 118. Completing the second pulse before cam 107 goes back on lift minimizes any chance of a latch pin 118 being partially actuated at that time.

Act 311 is an optional act of allowing the current in the circuit to decay as in act 307 in preparation for providing a third pulse. Act 312 is an optional act of providing the third pulse. In some of these teachings the third pulse is a non-actuating pulse like the second, but having opposite polarity from the second. Act 313 is taking one or more measurements of current that results from the third pulse.

The measurements of current resulting from a pulse usually includes measurements taken during the pulse period. In some of these teachings, the measurements include measurements taken during a decay period that follows the end of the pulse. If the position of a latch pin 118 at the end of a pulse matches the position to which the latch pin is biased by the pulse, the decay of the pulse will be faster than if the latch pin 118 is in the opposite position. The difference may be attributed to the alignment or non-alignment of polarities within ferromagnetic materials with the magnetic field produced by a coil 119.

Act 315 is comparing the primary response to one or more reference responses to provide diagnostic information. In some of these teachings, the diagnostic information relates to the number of latch pins 118 in the circuit 200 that were actuated by the first pulse. In some of these teachings, the diagnostic information relates to the positions of the latch pins 118 that are in the circuit 200. In some of these teachings, the circuit 200 contains only one coil 119 that is coupled through an armature 131 to a latch pin 118. In some of these teachings, the circuit 200 contains two coils 119, each of which is coupled to a distinct latch pin 118. The methods of the present disclosure may also be applicable to circuits 200 that include more than two coils 119. Some options for comparing the reference response to the primary response to generate the diagnostic information are discussed below with reference to FIGS. 10-19.

Act 317 is reporting the diagnostic information. In some of these teachings, the diagnostic information is reported to a controller that controls engine 100 based on that information. The control response may include, for example, adjusting fuel injection or spark ignition timing. Another control response could be initiating a second attempt to actuate a latch pin 118, perhaps with a higher voltage. In some of these teachings, the diagnostic information is reported by recording a diagnostic code in a memory system. The diagnostic code may later be read by a mechanic or an automated system. In some of these teachings, the diagnostic information is reported to an operator. For example, a problem may be reported to a driver through a visual display in the form of an icon or a warning light. In some of these teachings, the diagnostic information is reported wirelessly to a remote server.

Figure 10:
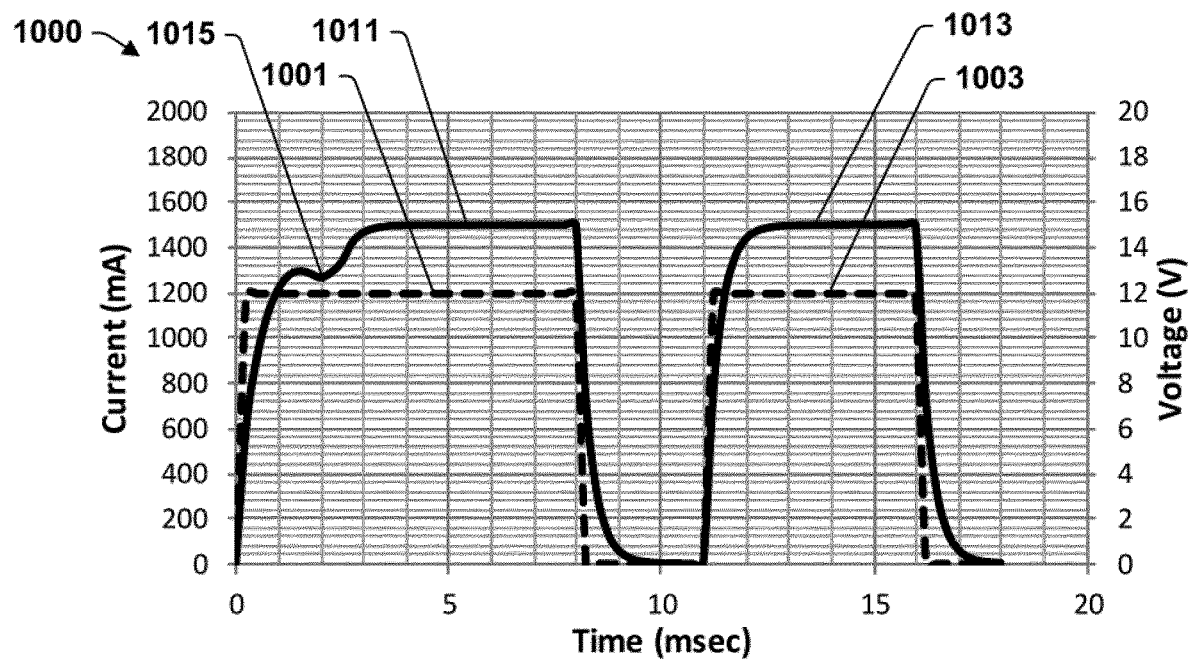
FIG. 10 is a plot showing two pulses in accordance with a method of the present teachings and corresponding current responses.

FIG. 10 is a plot 1000 showing the effect of applying two voltage pulses 1001 and 1003 both having the same polarity to two coils 119 in a circuit such as circuit 200. The first pulse 1001 is 8 msec long and the second pulse 1003 is 5 msec long. A period of 3 msec between pulse 1001 and 1003 allows the current in the circuit to decay. FIG. 10 illustrates that the current response 1011 produced by pulse 1001 when that pulse actuates two latch pins 118. Current response 1011 may be used as the primary response. Current response 1013 is produced by pulse 1003 and may be used as the reference response. None of the latch pins 118 move in response to pulse 1003.

The current response 1011 includes a dip 1015 that is related to motion of latch pins 118. Another difference between current response 1011 and reference response 1013 is that current response 1011 rises more slowly. The slower rise is due to a higher inductance. A third difference is that current response 1011 takes longer to reach steady state than current response 1013. The current response 1013 takes about 1.5 msec to reach steady state. The current response 1011 takes about 3.5 msec to reach steady state.

Figure 11:
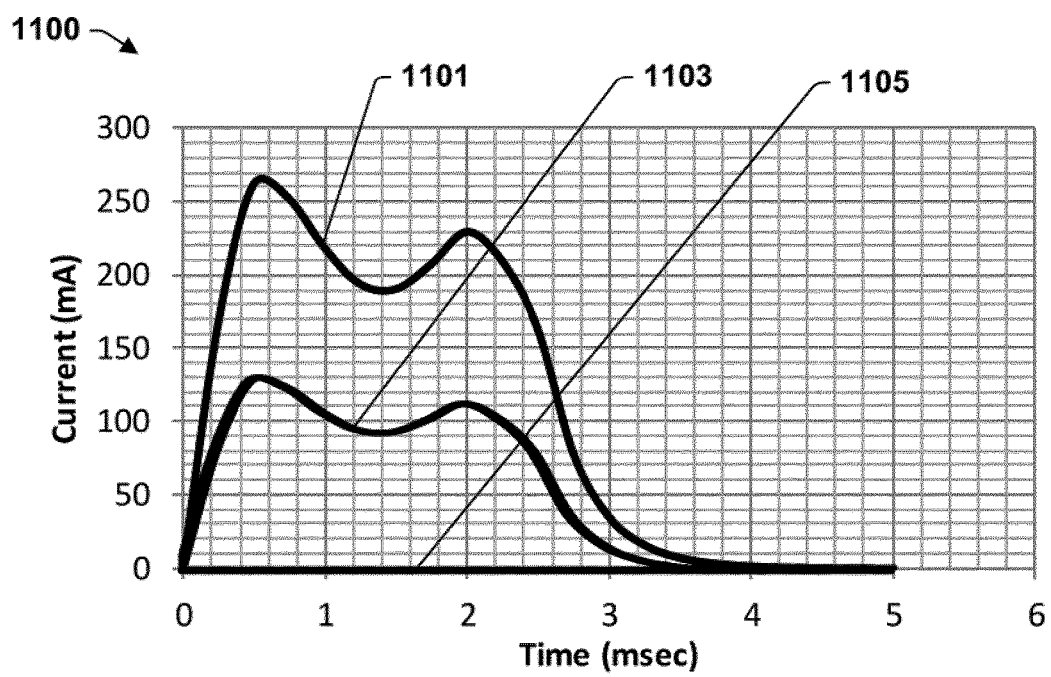
FIG. 11 is a plot of the difference between the two current responses of FIG. 10.

FIG. 11 plots the arithmetic difference 1101 between current response 1013 and current response 1011. The arithmetic difference is a metric of difference. Other metrics of difference include the absolute value of the difference and the square of the difference. Summed over time, the arithmetic difference is, for example, about 510 mA·msec. If only one latch pin 118 moved, the sum would be about half as much as represented by curve 1103. If neither latch pin 118 moved, the sum would be about zero as represented by curve 1105. An integral (sum) of the difference between current response 1013 and current response 1011 may be compared to a predetermined threshold to determine the scenario most likely to have produced the primary response. The predetermined threshold may be obtained from a look-up table. Alternative, the predetermined threshold may be obtained from one or more recently obtained results for the same circuit or a similar circuit to determine the scenario most likely to have produced the primary response.

Figure 12:
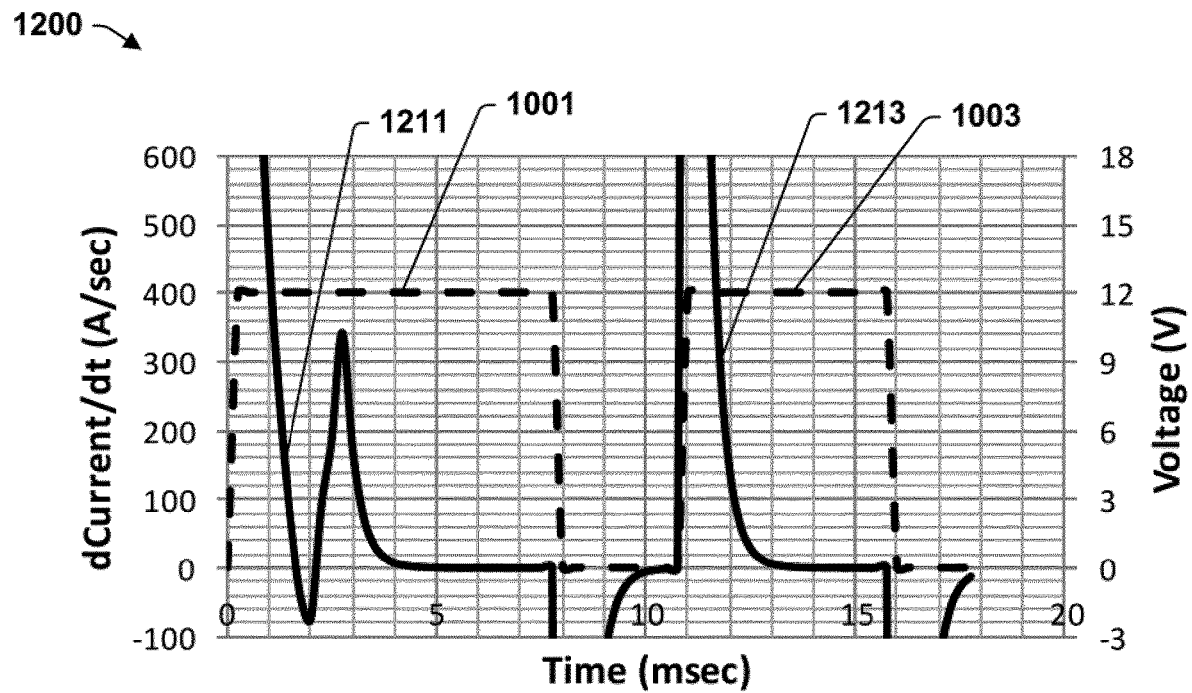
FIG. 12 is a plot showing the two pulses of FIG. 10 and the derivatives of the corresponding current responses.
Figure 13:
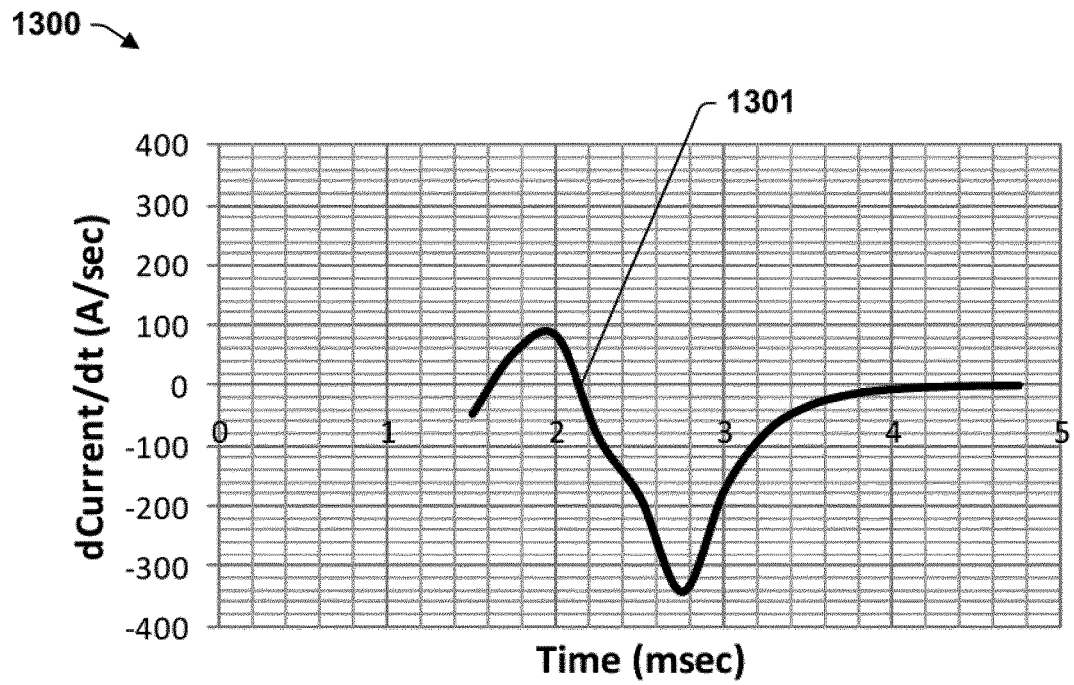
FIG. 13 is a plot of the differences between the derivatives of the current responses shown FIG. 12.

FIG. 12 is a plot 1200 showing the two voltage pulses 1001 and 1003 and the derivatives of the current responses. The curve 1211 is the differential of the current response 1011 of FIG. 10 and the curve 1213 is the differential of the current response 1013. FIG. 13 plots the difference 1301 between curves 1213 and curve 1211. The difference 1301 is shown only for a period beginning 1.5 msec after the starts of the pulses 1001 and 1003. The differentials for periods that begin from the initiation of the pulses can be very large and may have a low signal to noise ratio.

The difference 1301 is a metric of the difference in the differentials of the current response 1013 and the current response 1011. Other metrics of differential are the absolute value of the differential and the square of the differential. Summed over the time interval from 1.5 msec to 4.75 msec after the beginnings of the pulses 1001 and 1003, the absolute value of the differential is about 1069 A. If only one latch pin 118 moved, the sum would be about half as much. If neither latch pin 118 moved, the sum would be about zero. The sum may be compared to a predetermined threshold to determine the scenario most likely to have produced the primary response. The methods with sums may be effective even if each data set has only one data point.

Figure 14:
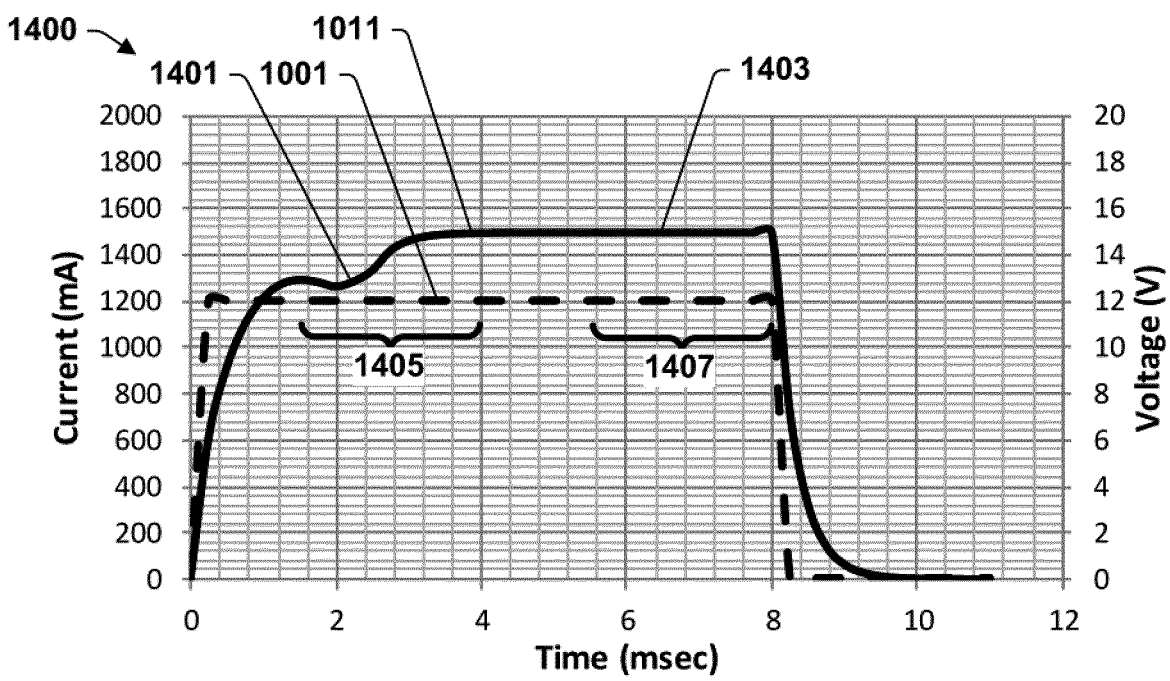
FIG. 14 is a plot of the first pulse of FIG. 10 and the current response to that pulse identifying a portion of that response that may be used as the primary response and another portion that may be used as the reference response in accordance with some aspects of the present teachings.

FIG. 14 is a plot 1400 of voltage pulse 1001 and the response curve 1011 identifying a first portion 1401 that may be taken as the primary response and a second portion 1403 that may be taken as the reference response. Second portion 1403 corresponds to a diagnostic interval 1407, which is an interval over which the response curve 1011 is at steady state regardless of the number of latch pins 118 that actuate in response to pulse 1001. First portion 1401 corresponds to a primary interval 1405, which is an interval over which the response will be near steady state if and only if neither latch pin 118 is actuated by the pulse 1001.

Figure 15:
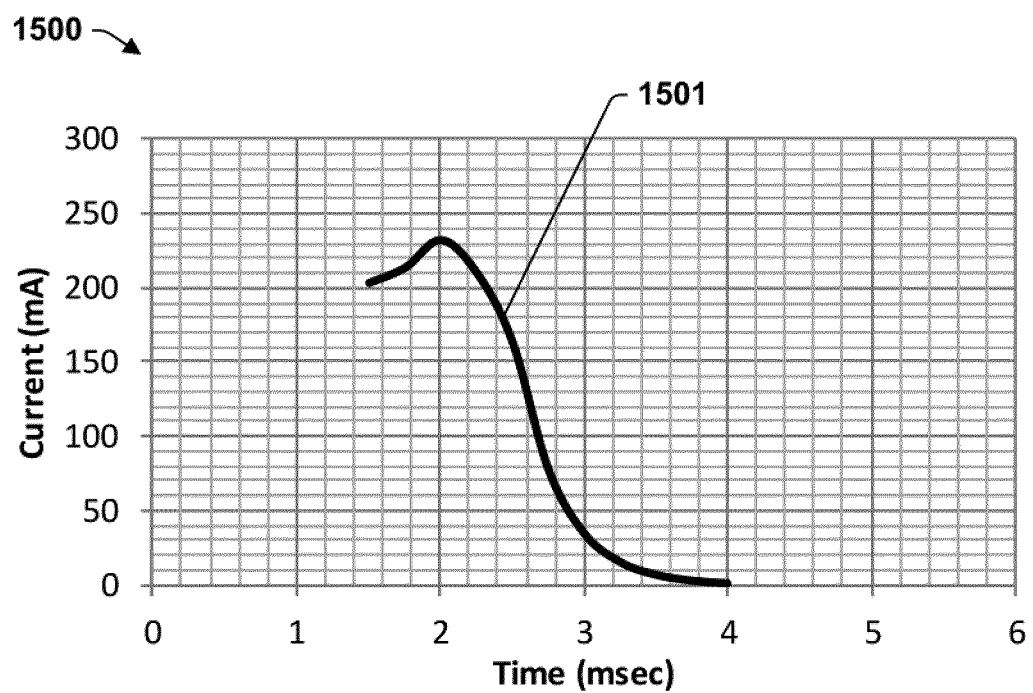
FIG. 15. is a plot showing the difference between the primary response and the reference response of FIG. 14.

FIG. 15 is a plot 1500 of the difference 1501 between second portion 1403 and first portion 1401 for the case in which both latch pins 118 moved. The area under curve 1501 would be approximately half as large if only one of the latch pins 118 moved and would be approximately zero if neither latch pin moved. As in other examples, any suitable metric of difference or difference in differential may be used and the metric value may be compared to a predetermined value to determine the diagnostic result. The current may be expected to remain constant during the diagnostic interval. In some of these teachings, a variation in current over the diagnostic interval is used to estimate noise in the measurements. An estimate of noise may be used to determine whether the difference between the primary response and the reference response is statistically significant.

Figure 16:
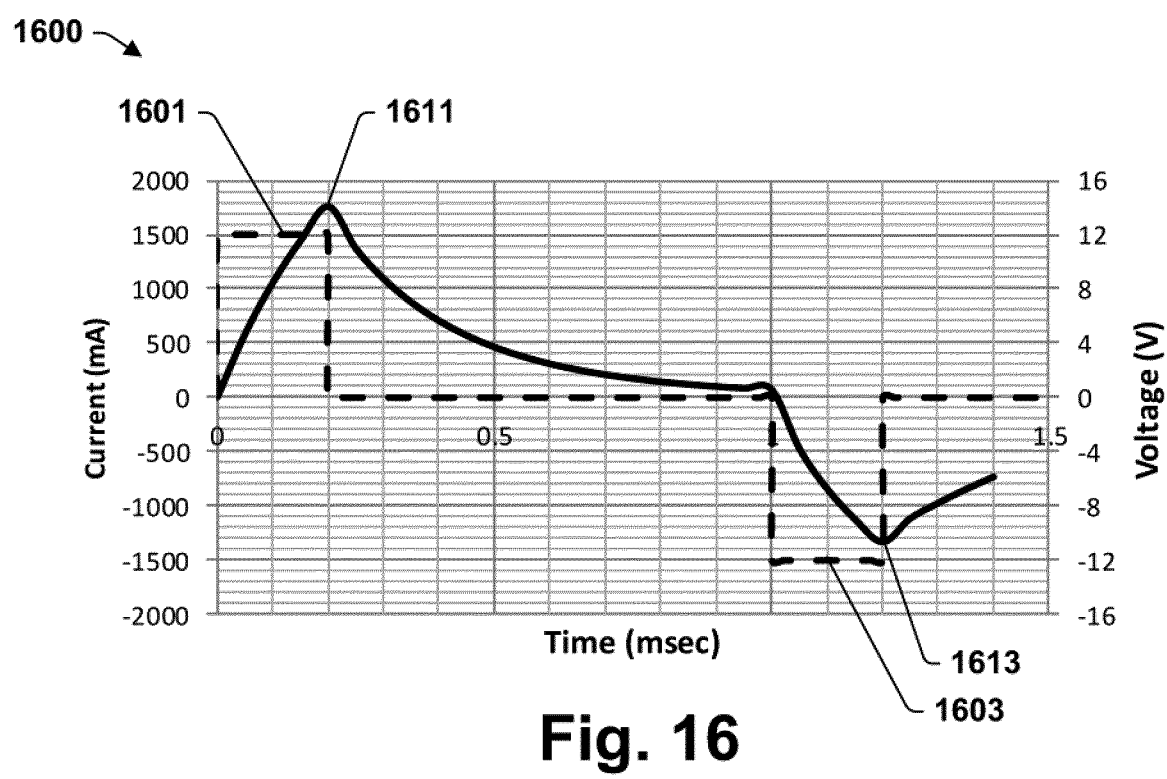
FIG. 16 is a plot of two pluses in accordance with some aspects of the present teachings and the corresponding current responses.

FIG. 16 is a plot 1600 showing the effect of applying two voltage pulses 1601 and 1603 according to some of the present teaching to a circuit such as circuit 200 and the corresponding current response. Both the first pulse 1601 and the second pulse 1603 are non-actuating pulses that are short in comparison to a voltage pulse used for actuation. For example, the non-actuating pulses may be 0.2 msec as compared to an 8 msec actuating pulse. A period of 0.8 msec between pulse 1601 and 1603 allows the current in circuit 200 to decay. The polarity of the second pulse 1603 is opposite that of the first pulse 1601. The peak current 1611 produced by the first pulse it about 1750 mA. The peak current 1613 produced by the second pulse it about −1300 mA. The larger peak is an indication that latch pins 118 are in the position resulting from an actuating pulse of the same polarity. If both peaks are the same size, that indicates one of the latch pins 118 is in the first position and the other is in the second position.

Figure 17:
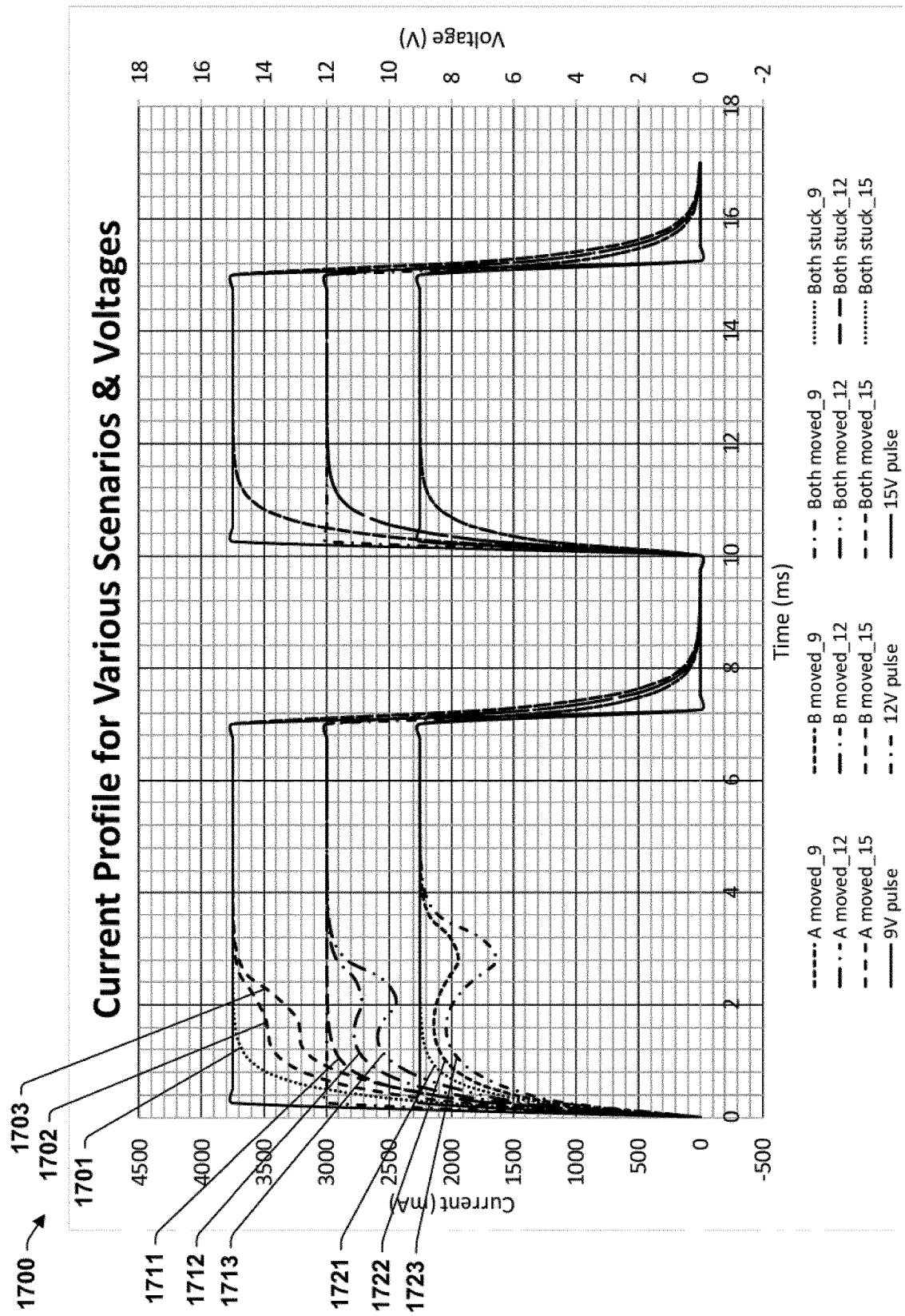
FIG. 17 is a plot showing how the current responses of FIG. 10 vary depending on the pulse voltages and the number of latch pins that actuate in response to the first pulse.

FIG. 17 is a plot 1700 showing how the responses of FIG. 10 are affected by variations in voltage. Curves 1701, 1702, and 1703 are responses to a 15V pulse. Curves 1711, 1712, and 1713 are responses to a 12V pulse. Curves 1721, 1722, and 1723 are responses to a 9V pulse. Curves 1701, 1711, and 1721 are responses for cases in which neither latch pin moves. Curves 1702, 1712, and 1722 are responses for cases in which one of two latch pin moves. Curves 1703, 1713, and 1723 are responses for cases in which both latch pins 118 move.

As the voltage used to provide the pulses increases, the steady state current increases. The forces applied to latch pins 118 increase with current. But as shown by FIG. 17, the difference in current response between the cases in which both latch pins 118 actuate, one latch pin 118 actuates, and neither latch pin 118 actuates become less evident as current increases. Accordingly, limiting the current by limiting voltage used for the pulses can facilitate providing diagnostic feedback. For example, a transformer may be provided that doubles the voltage provided by a vehicle electrical system to provide voltages in the range from 18V to 32V while a controller limits the voltage actually used for the pulses to 24V. While it is desirable to increase current to a certain point to ensure the forces applied to the latch pins 118 are sufficient for actuation, it is also desirable to limit voltage to preserve diagnostic information.

The optimal voltage also depends on temperature. The greater the temperature, the less the current for a given voltage. The voltage required for latch pin actuation is less at lower temperature. It is desirable to limit voltage to a greater degree at lower temperatures as compared to at higher temperatures in order to increase the reliability of diagnostic determinations according to the present teachings.

The positions of the dips in the curves shown in FIG. 17 indicate that latch pins 118 actuate more quickly when current is high. For that reason, it may be desirable to adjust the sampling intervals used for the primary response and the reference response in relation to current. In some of these teachings, the adjustments are made based on voltage and temperature. In others of these teachings, a measurement of current in the circuit is used to determine the intervals.

Figure 18:
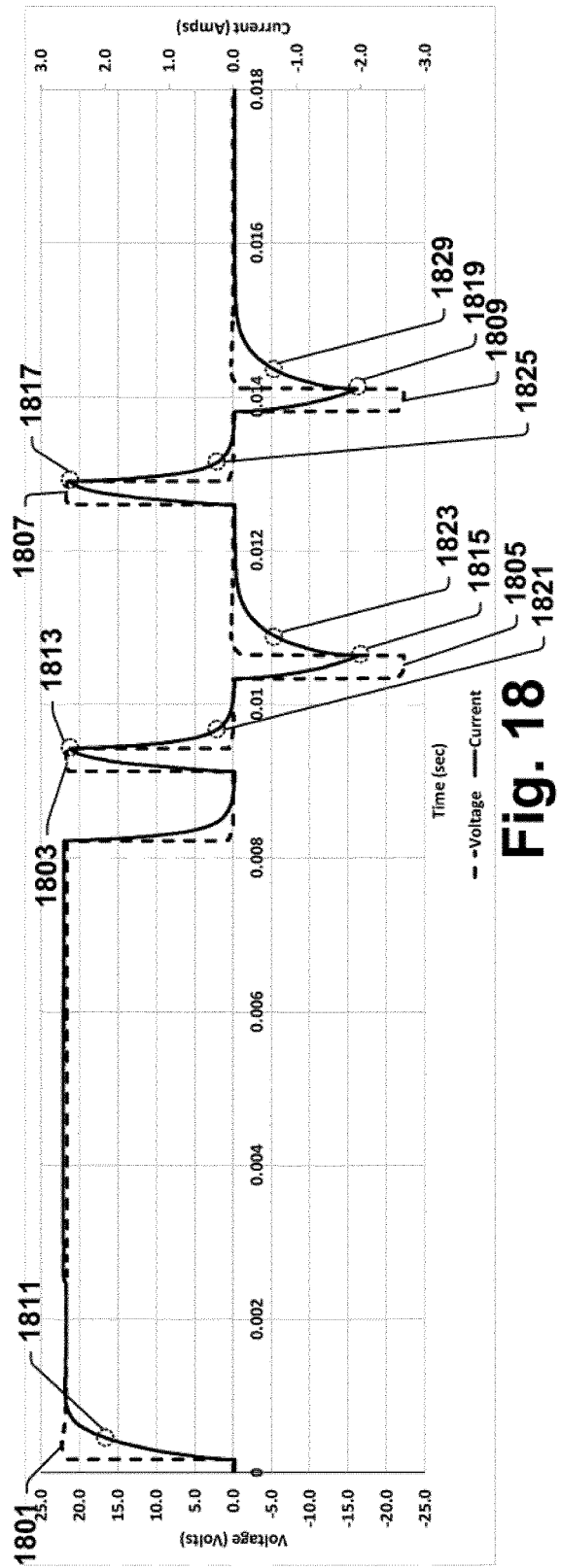
FIG. 18 is a plot showing the current responses to an actuating pulse and several subsequent non-actuating pulses in a case in which latch pin actuation is successful and the circuit is pulsed and the responses measured in accordance with the present teachings.
Figure 19:
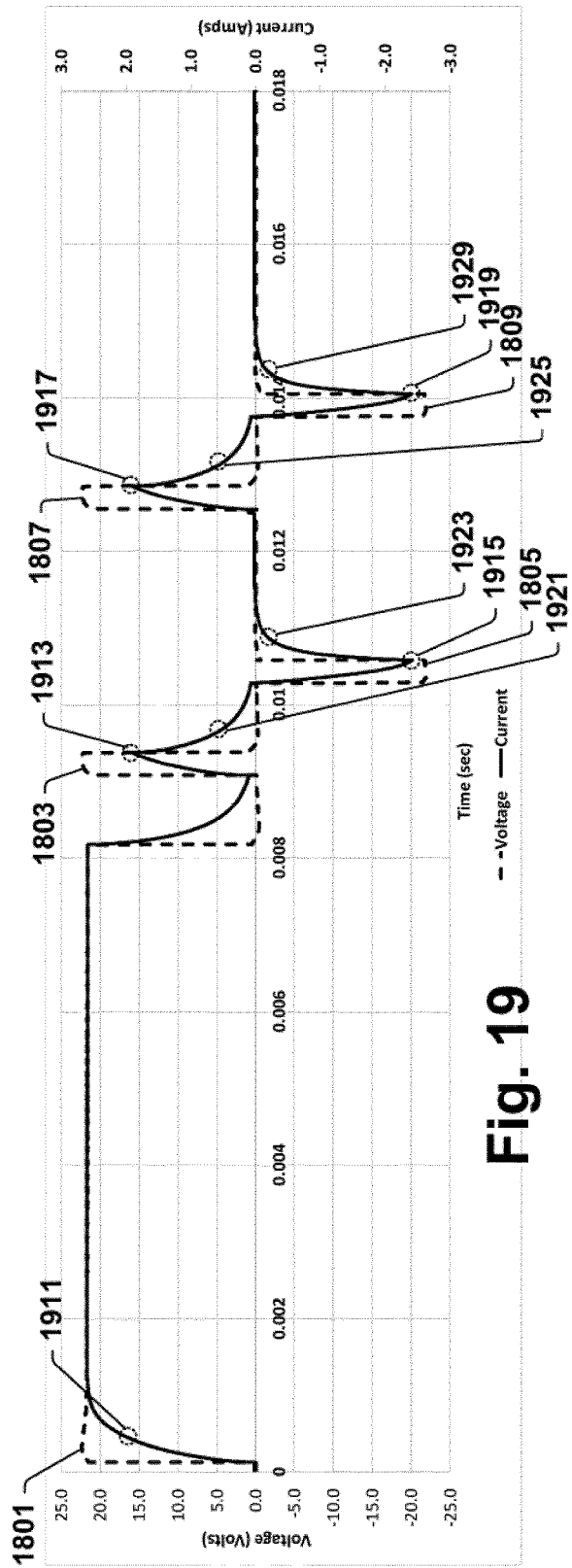
FIG. 19 is a plot showing the current responses to an actuating pulse and several subsequent non-actuating pulses like those of FIG. 18, but for a case in which latch pin actuation is unsuccessful.

FIGS. 18 and 19 illustrate an example in which an actuating pulse 1801 is followed by a series of non-actuating pulses 1803, 1805, 1807 and 1809 in accordance with some aspects of the present teachings. Pulses 1803 and 1807 have the same polarity as the actuating pulse 1801. Pulses 1805 and 1808 have the opposite polarity. FIG. 18 provides an example in which actuation of a latch pin 118 is successful. FIG. 19 provides an example in which the actuation is unsuccessful as may be the case if the latch pin 118 is stuck.

Pulse 1801 is 8 msec long whereas the non-actuating pulses are 0.3 msec long. The current is measured once 0.3 msec after the beginning of each pulse. This timing corresponds to the ends of the non-actuating pulses. These measurements provide data points 1811, 1813, 1815, 1817, and 1819 in FIG. 18 and data points 1911, 1913, 1915, 1917, and 1919 in FIG. 19. The current is also measured once 0.3 msec after the end of each non-actuating pulse. These measurements provide data points 1821, 1823, 1825, and 1829 in FIG. 18 and data points 1921, 1923, 1925, and 1929 in FIG. 19.

TABLE 1

| Pulse # | First (1801) | Second (1803) | Third (1805) | Fourth (1807) | Fifth (1809) |
|---|---|---|---|---|---|
| Successful | 2.059 (1811) | 2.545 (1813) | −1.967 (1815) | 2.548 (1817) | −1.947 (1819) |
| Unsuccessful | 1.906 (1911) | 1.907 (1913) | −2.415 (1915) | 1.903 (1917) | −2.408 (1919) |

As shown in Table 1, in the case of a successful actuation attempt, the current measurements 1813 and 1817 that correspond to non-actuating pulses 1803 and 1807 that have the same polarity as actuating pulse 1801, differ by more than 10% from the current measurement 1811 from the actuating pulse 1801. On the other hand, the current measurements 1815 and 1819, which correspond to non-actuating pulses 1805 and 1809 having opposite polarity from actuating pulse 1801, have absolute values within 10% of the current measurement 1811. All these relationships are consistent with the attempt at actuation having been successful.

By comparison, in the case of an unsuccessful actuation attempt, the current measurements 1913 and 1917 that correspond to non-actuating pulses 1803 and 1807 that have the same polarity as actuating pulse 1801, are with 10% of the current measurement 1911 from the actuating pulse 1801. On the other hand, the current measurements 1915 and 1919 that correspond to non-actuating pulses 1805 and 1809 having opposite polarity from actuating pulse 1801, have absolute values that differ by more than 10% from the current measurement 1911. All these relationships are consistent with the attempt at actuation having been unsuccessful.

TABLE 2

| Pulse # | Second (1803) | Third (1805) | Fourth (1807) | Fifth (1809) |
|---|---|---|---|---|
| Successful | 0.170 (1821) | −0.551 (1823) | 0.182 (1825) | −0.511 (1829) |
| Unsuccessful | 0.533 (1921) | −0.188 (1923) | 0.522 (1925) | −0.186 (1929) |

Table 2 compares the current measurements 1821, 1823, 1825, and 1829 for the decay period for the non-actuation pulses 1803, 1805, 1807, 1809 following a successful actuation to the current measurements 1921, 1923, 1925, and 1929 for a non-successful actuation. In the case where actuation is successful, the absolute values for the decay current are much less if the non-actuating pulse has the same polarity as the actuating pulse. The situation is reversed if the actuation is unsuccessful. These differences may be used to query latch pin position or determine if an attempt at latch actuation has been successful.

The components and features of the present disclosure have been shown and/or described in terms of certain embodiments and examples. While a particular component or feature, or a broad or narrow formulation of that component or feature, may have been described in relation to only one embodiment or one example, all components and features in either their broad or narrow formulations may be combined with other components or features to the extent such combinations would be recognized as logical by one of ordinary skill in the art.

The invention claimed is:

1. A method of providing diagnostic information for an electromagnetic latch system comprising one or more latch pins, the method comprising:
   providing a first pulse as an actuating pulse of direct current to a circuit that comprises one or more coils each of which is inductively coupled with an armature that is mechanically coupled to at least one latch pin among the one or more latch pins to move between a first position and a second position;
   determining a first response by making one or more measurements of a current in the circuit over a first interval, wherein the current in the circuit over the first interval results from the first pulse;
   providing a second pulse as a non-actuating pulse of direct current to the circuit;
   determining a second response by making one or more measurements of a current in the circuit over a second interval, wherein the current in the circuit over the second interval results from the second pulse;
   providing a third pulse as a non-actuating pulse of direct current to the circuit, wherein the third pulse is predetermined to be insufficient in duration to actuate any of the one or more latch pins and has an opposite polarity from the second pulse;
   determining a third response by making one or more measurements of a current in the circuit over a third interval, wherein the current in the circuit over the third interval results from the third pulse;
   providing diagnostic information relating to a number, movement, or position of the one or more of the latch pins that are actuated by the first pulse based at least in part on a comparison of the first response, with the second response, and the third response;
   the first pulse, the second pulse, and the third pulse occur within one cycle of the cam, wherein the second pulse and the third pulse follow the first pulse;
   actuating a first of the one or more latch pins from the first position to the second position by pulsing the circuit with a first DC current having a polarity; and
   actuating the first latch pin from the second position back to the first position by pulsing the circuit with a second DC current having an opposite polarity,
   wherein a similarity between the first response and the third response combined with dissimilarity between the first response and the second response indicates first latch pin actuation, and a dissimilarity between the first response and the third response combined with a similarity between the first response and the second response indicates of an unsuccessful actuation of the first latch pin;
   wherein the electromagnetic latch system is operative to stably maintain the first latch pin in each of the first position and the second position when the circuit is without power.

2. The method of claim 1, wherein:
   the first pulse is predetermined to be capable of actuating the one or more latch pins;
   the second pulse is predetermined to be insufficient in duration to actuate any of the one or more latch pins.

3. The method of claim 2, wherein:
   the electromagnetic latch system is part of a valvetrain comprising a switching rocker arm actuated by a cam rotating through a cam cycle; and
   the first pulse and the second pulse occur within one cycle of the cam.

4. The method of claim 2, wherein the second pulse follows the first pulse.

5. The method of 1, wherein:
   the electromagnetic latch system is part of a valvetrain comprising a switching rocker arm actuated by a cam rotating through a cam cycle with the first pulse, the second pulse, and the third pulse occurring within one cycle of the cam.

6. The method of claim 1, wherein power for the first pulse is provided by a vehicle electrical system having a variable voltage.

7. The method of claim 1, wherein a current in the circuit is allowed to decay between the first pulse and the second pulse.

8. The method of claim 1, wherein:
   the electromagnetic latch system is part of a valvetrain comprising a switching rocker arm actuated by a cam rotating through a cam cycle; and
   the second pulse occurs while the cam is on lift.

9. The method of 1, further comprising:
   providing power for the first pulse from a DC power source having a higher voltage than the first pulse; and
   using a controller to limit the voltage of the first pulse.

10. The method of claim 9, further comprising limiting a voltage used to provide the pulse selectively based on a temperature.

11. A method of providing diagnostic information for an electromagnetic latch system comprising two latch pins, the method comprising:
    providing a first pulse as an actuating pulse of direct current to a circuit that comprises two coils each of which is inductively coupled with an armature that is mechanically coupled to a respective one of the two latch pins to move between a first position and a second position;
    determining a first response by making one or more measurements of a current in the circuit over a first interval, wherein the current in the circuit over the first interval results from the first pulse;
    providing a second pulse as a non-actuating pulse of direct current to the circuit;
    determining a second response by making one or more measurements of a current in the circuit over a second interval, wherein the current in the circuit over the second interval results from the second pulse;
    providing a third pulse as a non-actuating pulse of direct current to the circuit, wherein the third pulse is predetermined to be insufficient in duration to actuate any of the one or more latch pins;
    determining a third response by making one or more measurements of a current in the circuit over a third interval, wherein the current in the circuit over the third interval results from the third pulse; and
    providing diagnostic information that distinguishes among the three cases consisting of neither of the two latch pins moved, only one of the two latch pins moved that is actuated by the first pulse, and both of the two latch pins that are actuated by the first pulse moved based at least in part on a comparison between the first response, the second response, and the third response;

the first pulse, the second pulse, and the third pulse occur within one cycle of the cam, wherein the second pulse and the third pulse follow the first pulse;

wherein a similarity between the first response and the third response combined with dissimilarity between the first response and the second response indicates first latch pin actuation, and a dissimilarity between the first response and the third response combined with a similarity between the first response and the second response indicates of an unsuccessful actuation of the first latch pin.

12. The method of claim 11, wherein:
the first pulse is predetermined to be capable of actuating the one or more latch pins;
the second pulse is predetermined to be insufficient in duration to actuate any of the one or more latch pins.

13. The method of claim 11, further comprising using a controller to limit the voltage of the first pulse selectively based on a temperature.

14. A method of providing diagnostic information for an electromagnetic latch system comprising one or more latch pins, the method comprising:
providing a first pulse as an actuation pulse of direct current to a circuit that comprises one or more coils each of which is inductively coupled with an armature that is mechanically coupled to at least one latch pin among the one or more latch pins to move between a first position and a second position;
determining a first response by making one or more measurements of a current in the circuit over a first interval, wherein the current in the circuit over the first interval results from the first pulse;
providing a second pulse as a non-actuating pulse of direct current to the circuit;
determining a second response by making one or more measurements of a current in the circuit over a second interval, wherein the current in the circuit over the second interval results from the second pulse;
providing a third pulse as a non-actuating pulse of direct current to the circuit, wherein the third pulse is predetermined to be insufficient in duration to actuate any of the one or more latch pins and has an opposite polarity from the second pulse;
determining a third response by making one or more measurements of a current in the circuit over a third interval, wherein the current in the circuit over the third interval results from the third pulse;
providing diagnostic information relating to a number, movement or position of the one or more of the latch pins that are actuated by the first pulse based at least in part on a comparison of the first response, with the second response, and the third response; wherein the first pulse and the second pulse have opposite polarities; the first pulse, the second pulse, and the third pulse occur within one cycle of the cam, and wherein the second pulse and the third pulse follow the first pulse;
wherein a similarity between the first response and the third response combined with dissimilarity between the first response and the second response indicates first latch pin actuation, and a dissimilarity between the first response and the third response combined with a similarity between the first response and the second response indicates of an unsuccessful actuation of the first latch pin.

15. The method of claim 14, wherein:
the first pulse is predetermined to be capable of actuating the one or more latch pins;
the second pulse is predetermined to be insufficient in duration to actuate any of the one or more latch pins.

16. The method of claim 14, wherein:
the one or more coils comprise two coils associated with two latch pins; and
the diagnostic information distinguishes among the three cases consisting of neither latch pin moved, only one of the latch pins moved, and both latch pins moved.

* * * * *